United States Patent [19]

Coons

[11] 4,210,905

[45] Jul. 1, 1980

[54] ALARM FOR WAKING A DOZING DRIVER

[76] Inventor: David A. Coons, 753 E. 1825 South, Bountiful, Utah 84010

[21] Appl. No.: 926,843

[22] Filed: Jul. 21, 1978

[51] Int. Cl.$^2$ .......................... G08B 21/00; B60Q 5/00
[52] U.S. Cl. ................................. 340/575; 340/52 R; 180/280; 180/272
[58] Field of Search ....................... 340/53, 52 R, 575; 180/82 R, 97, 98, 99

[56] References Cited

U.S. PATENT DOCUMENTS 2,575,926  11/1951  Murray ................................. 340/575

FOREIGN PATENT DOCUMENTS 370967  12/1938  Italy ......................................... 340/575
711647  7/1954  United Kingdom ..................... 340/575

Primary Examiner—Alvin H. Waring
Attorney, Agent, or Firm—Mallinckrodt & Mallinckrodt

[57] ABSTRACT

An alarm for waking a dozing driver includes a plurality of electrical switches arranged about the steering wheel of a vehicle. A rigid member extends continuously about the steering wheel and is resiliently attached thereto and arranged with respect to the switches so that a normal grasp of the steering wheel causes the rigid member to be displaced and at least one of the plurality of switches to change from its normal position. Alarm means are electrically connected with the plurality of switches and with a power supply so that the change of state of a switch from its normal position deactivates the alarm means.

9 Claims, 11 Drawing Figures

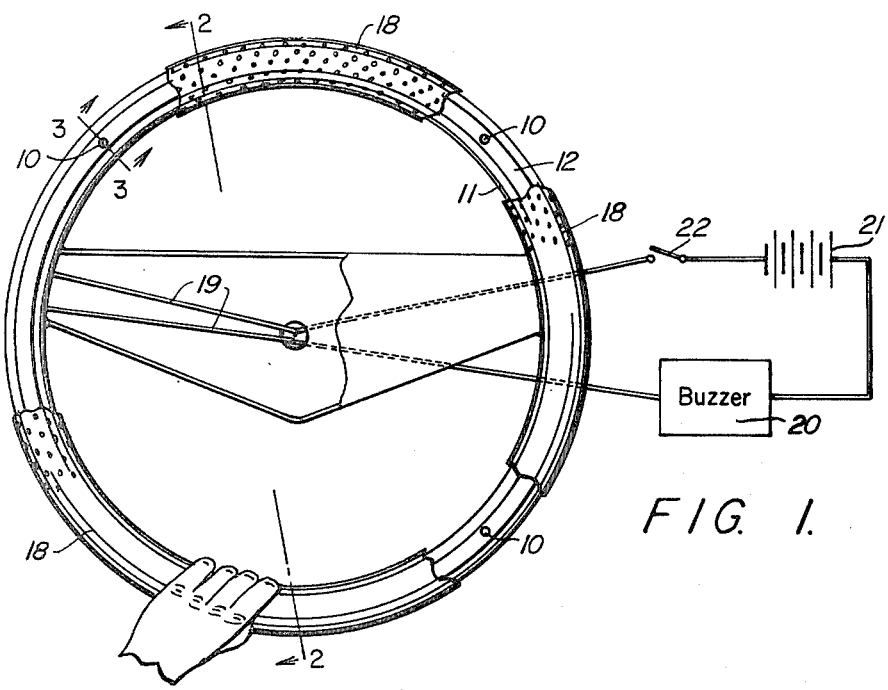
FIG. 1.
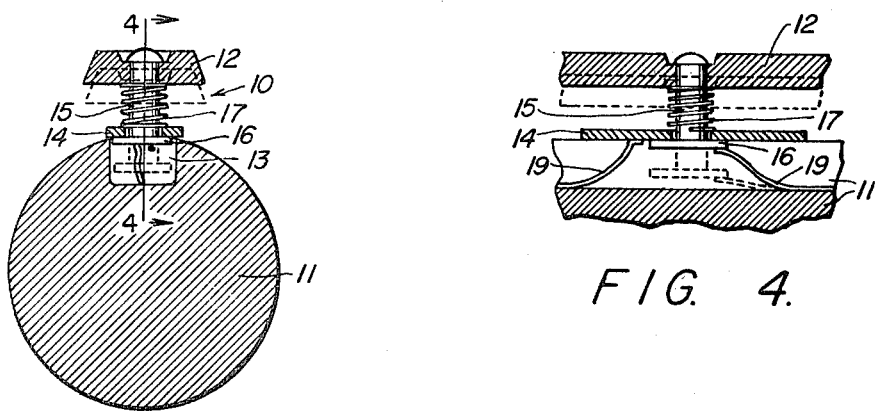
FIG. 3.
FIG. 4.
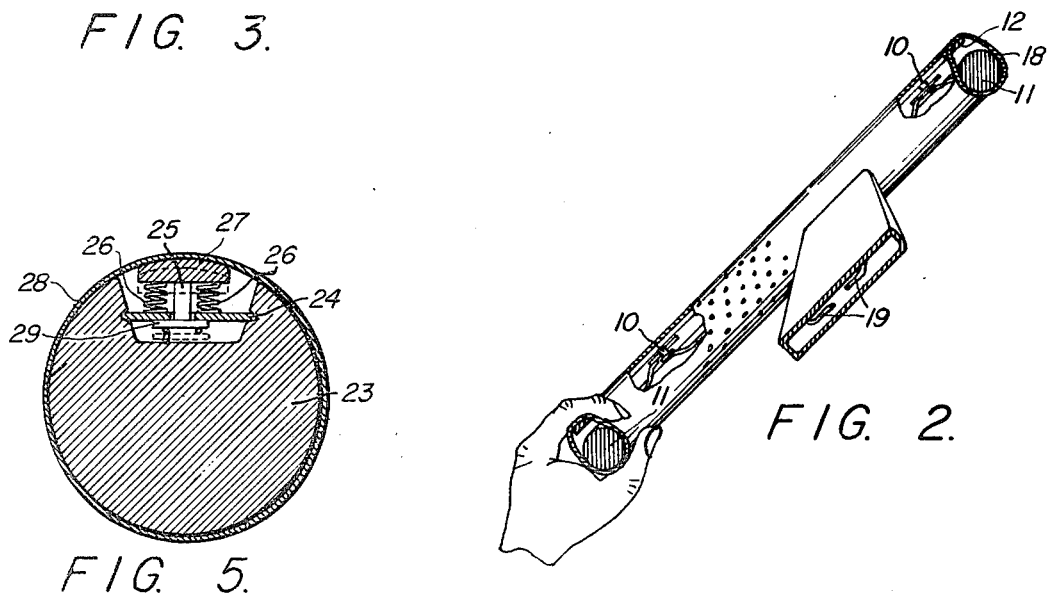
FIG. 5.
FIG. 2.

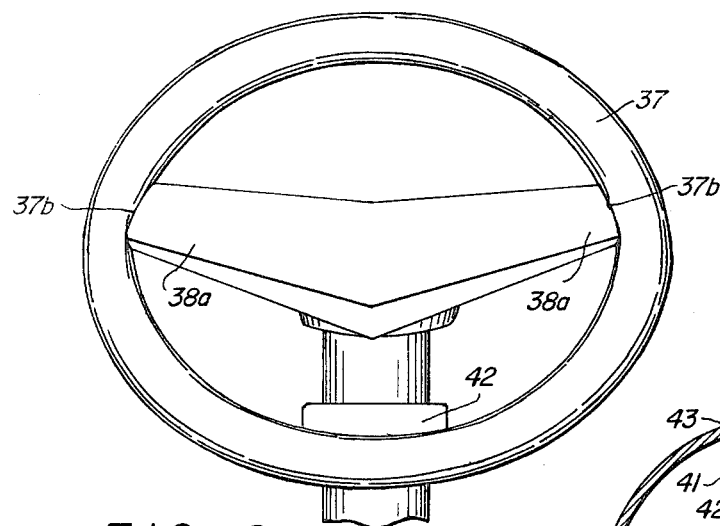
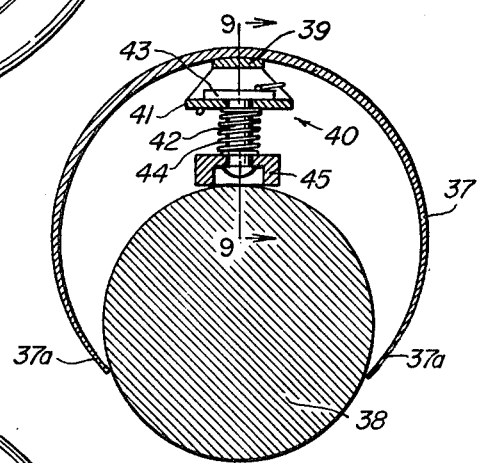
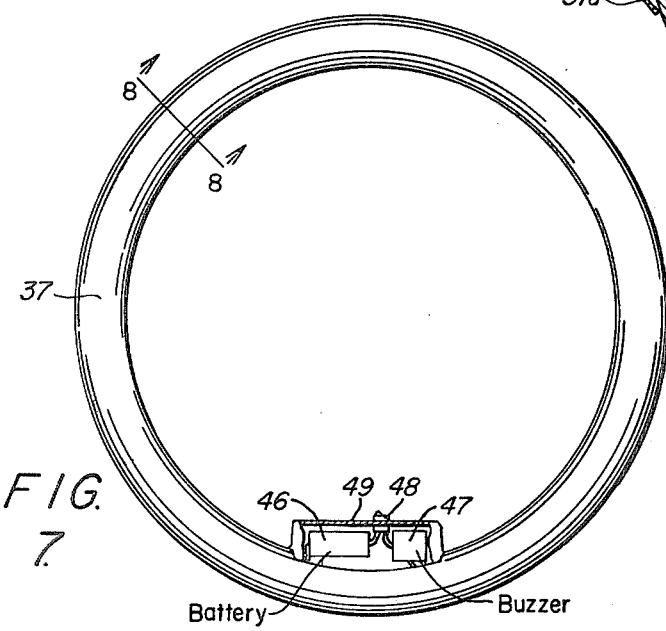
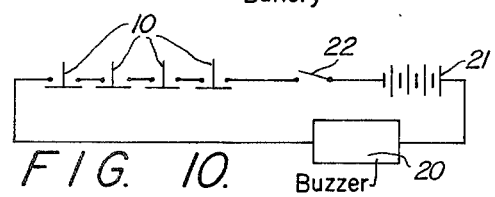
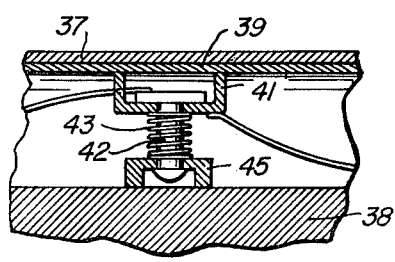
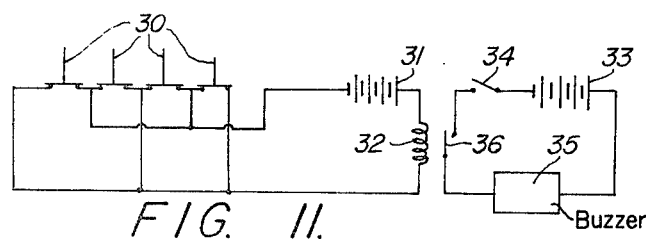

10

4,210,905

ALARM FOR WAKING A DOZING DRIVER

BACKGROUND OF THE INVENTION

1. Field

The invention is in the field of safety devices for motor vehicles, particularly such devices adapted to warn a driver that he is falling asleep.

2. State of the Art

A number of systems have been developed to warn a driver of a motor vehicle when he is about to fall asleep. Some of these systems have a sensor which is worn by the driver and is responsive to some sleep related psychological phenomenon such as nodding of the driver's head or changes in the driver's pulse rate. Other systems require the driver to wear a special glove. Still other systems require the driver to either squeeze the steering wheel at intervals or to periodically operate other mechanisms attached to the steering wheel.

It has been found that when a person begins to doze, his grip on the steering wheel loosens. Thus, an apparatus which detects this loosening of the driver's grip can provide an effective basis for an alarm to wake the driver.

Systems such as shown in U.S. Pat. Nos. 2,128,916 and 2,575,926 include steering wheels having pressure-responsive switches thereon so that when the steering wheel is squeezed an electrical circuit is either opened or closed. Such devices still leave room for improvement in operability and effectiveness of the alarm.

SUMMARY OF THE INVENTION

In accordance with the invention, an alarm for waking a dozing driver includes a plurality of electrical switches arranged preferably symmetrically about the steering wheel of a vehicle. A rigid member extends continuously about the steering wheel and is resiliently attached thereto. The rigid member is operatively arranged with respect to the plurality of switches so that a normal grasp of the steering wheel causes the rigid member to be displaced and at least one switch of the plurality of switches to change from its normal position. An alarm means is electrically connected to the plurality of switches and a power supply so that an alarm is given if all switches of the plurality are in their normal position. Thus when a driver grasps the steering wheel and causes at least one of the switches to change from its normal position no alarm occurs. If, on the other hand, the driver loosens his grip on the steering wheel so that all switches are in their normal position, an alarm is given.

In the preferred form of the invention, four switches are arranged equidistant about the steering wheel and are electrically connected in series. A rigid ring having a diameter substantially equal to that of the steering wheel is resiliently attached to the steering wheel such that it is normally urged away from the steering wheel and is operatively arranged so that in its normal position spaced from the steering wheel the four switches are in their normally closed positions and close the circuit to the alarm means. When the ring is urged toward the steering wheel upon normal grasping of the steering wheel and ring at least one of the switches is placed in open position, thereby breaking the circuit to the alarm means.

The switches and rigid member may be permanently attached to the steering wheel or built in as part of the steering wheel, or the rigid member and the switches may be built as a unit for detachable securement to the steering wheel when it is desired to use the alarm.

THE DRAWINGS

In the accompanying drawings which represent the best mode presently contemplated of carrying out the invention, FIG. 1 is a top plan view of a vehicle steering wheel incorporating the alarm of the invention and showing electrical components of the alarm diagrammatically;

FIG. 2, a vertical section taken on the line 2—2 of FIG. 1;

FIG. 3, a vertical section taken on the line 3—3 of FIG. 1 and drawn to a larger scale;

FIG. 4, a fragmentary vertical section taken on the line 4—4 of FIG. 3;

FIG. 5, a view similar to that of FIG. 3 but showing a slightly different embodiment of the switch;

FIG. 6, a pictorial view of a typical automobile steering wheel and cover therefor incorporating yet another embodiment of the invention;

FIG. 7, a top plan view of the steering wheel cover of FIG. 6, with a minor portion broken away to show otherwise hidden parts;

FIG. 8, a vertical section taken on the line 8—8 of FIG. 7 and drawn to a larger scale;

FIG. 9, a fragmentary vertical section taken on the line 9—9 of FIG. 8;

FIG. 10, a circuit diagram of one embodiment of the invention; and

FIG. 11, a circuit diagram of another embodiment of the invention.

DETAILED DESCRIPTION OF THE ILLUSTRATED EMBODIMENTS

As illustrated, an alarm for waking a dozing driver comprises a plurality of switches 10 arranged about a vehicle steering wheel 11. A rigid member in the form of a ring 12 extends continuously around the front of the steering wheel and is attached to each of the switches 10.

An embodiment of switch that may be installed on a permanent basis on an existing steering wheel is shown in FIGS. 3 and 4. Recesses 13 are formed in the steering wheel at the four switch locations shown in FIG. 1, such as by drilling. A contact plate 14 is secured over each recess in suitable manner, such as by gluing, screws, etc. Contact plate 14 is made of a conductive material and acts as one contact of a normally closed switch. A switch actuator 15 extends through a hole in contact plate 14. Switch actuator 15 is made of a non-conductive material and has attached to its end a conductive contact 16. Switch actuator 15 is attached to rigid ring 12 at its end opposite contact 16. A spring 17 between contact plate 14 and ring 12 urges the ring and switch actuator away from the steering wheel and urges contact 16 against contact plate 14. With contact 16 against contact plate 14, a circuit is closed and current can flow between the two. When ring 12 is depressed (shown in broken lines) switch actuator 15 is also depressed and contact 16 is moved away from contact plate 14, thereby opening the circuit. By the arrangement of the four switches about the steering wheel and with the rigid ring extending continuously about the front of the steering wheel, the strength of the springs urging the ring away from the steering wheel may be adjusted so that a normal grasp of the steering wheel at any point will displace the ring and cause one or more of the switches to open. A loosening of the grasp, as happens when a driver is nearing sleep, allows the ring to return to its normal position and all switches to close. A steering wheel cover 18 may be wrapped about the steering wheel to loosely cover the ring for decorative purposes.

The steering wheel switches described are connected in series with each other, such as by wires 19, and with a buzzer 20, battery 21, and on-off switch 22. This is shown diagrammatically in FIG. 1 and schematically in FIG. 10. With the on-off switch in "on" position when all steering wheel switches are in their normal closed position, the battery is connected to the buzzer and the buzzer sounds. If any one of the steering wheel switches is open, the circuit is broken, and no buzzer sounds.

The circuits could be arranged so that the vehicle battery provides the power and so that the ignition switch acts as the on-off switch. Thus, with the ignition on, the alarm circuit would be operational. Further, the circuitry could be arranged to operate the vehicle horn rather than, or in addition to, the buzzer shown.

An embodiment of steering wheel switch adapted to be built into a steering wheel is shown in FIG. 5. Such switch is similar to that described above, but, rather than providing individual recesses for each switch, the recesses are molded into a steering wheel 23 along with respective contact plates 24. Switch actuator 25 and springs 26 are arranged to hold rigid ring 27 in normal position as a continuation of the cross-sectional shape of steering wheel 23. Flexible material 28 extends about the outside of steering wheel 23 and over ring 27 to form a continuous unbroken surface that still allows movement of rigid ring 27 when the steering wheel is grasped in normal manner. When in normal position, contact 29 is against contact plate 24 and the switch is closed. When ring 27 is depressed, contact 29 moves away from contact plate 24 and the switch opens.

Any type of spring arrangement may be used to hold the rigid ring of the invention in its normal position, and any suitable type of switch could be substituted for the types described. For example, small push button switches could be used in place of the switches shown and springs could be located at points about the ring other than at the location of the switches. Also, four switches are not critical. In some instances, two or three switches could be arranged so that a grasp of the steering wheel and ring at any point would cause at least one of the switches to change from its normal position, and of course, more than four switches could be used.

Rather than having the switches normally closed and connected electrically in series, the switches provided could be normally open and arranged in parallel as shown electrically in FIG. 11. In such a case, one or more of the normally open switches 30 would be closed by the normal steering wheel grasp. The switches are electrically connected in parallel with one another and each independently in series with battery 31 and relay coil 32. A battery 33, on-off switch 34, and buzzer 35 are connected to the normally closed relay contacts 36, so that, when the relay is de-energized (no grasp on the steering wheel) and switch 34 is closed, the buzzer is activated. Upon energization of relay coil 32 resulting from closing of a steering wheel switch 30 by grasping the steering wheel, the relay contacts 36 open deactivating the buzzer. It should be realized that various other circuitry arrangements could be used for activating a buzzer or other alarm device.

FIGS. 6 through 9 show a self-contained embodiment of the alarm unit designed to be placed over a steering wheel of a vehicle when it is desired to have the sleep alarm of the invention available for use.

In this embodiment of the invention, a semi-rigid steering wheel cover 37 is formed to fit and be snapped over the usual automobile steering wheel 38, as shown in FIGS. 6 and 8. The cover 37 may be held in place merely by the resilience of the material from which it is made, so that its lower ends 37a are biased against the steering wheel 38, or may be held in place by other means, such as clamps which pass around the steering wheel. Cut-outs 37b for the steering wheel spokes 38a help to insure that the cover 37 and steering wheel 38 rotate as a unit.

A rigid ring 39 is molded into the top of the cover 37, or is attached thereto in some other suitable manner. Rather than a separate ring 39, the cover 37 can be made such that the portion at 39 is itself rigid.

Attached to rigid ring 39 and extending inside cover 37 are switches 40. These switches are preferably normally closed and may be of similar construction to those described. Thus, a contact plate 41 is attached to ring 39. Switch actuator 42 has a contact 43 attached to one end and is biased by spring 44 away from the ring so that contact 43 is normally held against contact plate 41 to close an electrical circuit. An enlarged head 45 on actuator 42 holds spring 44 in place and rests against steering wheel 38.

With cover 37 in place on steering 38, a grasp of the steering wheel and cover will displace the cover toward the steering wheel, thereby opening one or more of the switches 40 and preventing a buzzer or other alarm from sounding. A battery 46, buzzer 47, and on-off switch 48 are provided in an enlarged area molded into the cover at 49. The circuitry and its operation may be as already described.

With a self contained unit, the invention may be easily placed on a vehicle steering wheel when desired, such as on a long trip where sleep may be likely, and removed for normal short city trips where sleep is unlikely. Further, no modification of the steering wheel or complicated installation is required.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. An alarm for waking a dozing driver of a vehicle having a steering wheel, comprising in combination with such steering wheel a plurality of electrical switches arranged about the periphery thereof on the side of the steering wheel facing the driver; a rigid ring member of diameter substantially equal to the diameter of the steering wheel extending continuously about said periphery in juxtaposition with said plurality of switches and resiliently attached to said steering wheel so as to be positioned between the steering wheel and the driver, said rigid member being operatively arranged with respect to the plurality of switches so that a normal grasp of the steering wheel will cause said rigid member to be displaced toward the steering wheel and at least one switch of the plurality of switches to change from its normal position; alarm means electrically connected to said plurality of switches so that an alarm is given if all switches of the plurality are in their normal position; and means to supply power to the switches and the alarm means.

2. An alarm according to claim 1, wherein the switches are closed in their normal position and are connected electrically in series thereby connecting the source of power to the alarm means when all are in normal position.

3. An alarm according to claim 2, wherein each of the switches comprises a conducting contact plate secured to the steering wheel, a switch actuator extending through the contact plate into a recess in the steering wheel, a contact attached to the actuator, and a biasing means adapted to urge the switch actuator so that the contact attached thereto is urged against the contact plate in normal position and is forced into the recess away from the contact plate when the actuator is forced oppositely to the biasing means.

4. An alarm according to claim 3, wherein the switch actuator is operatively associated with the rigid ring so that the ring and switch actuator are biased by the same resilient means.

5. An alarm according to claim 1, wherein the switches are open in their normal position and are connected electrically in parallel and the alarm means is adapted to give an alarm when all switches are open.

6. An alarm according to claim 1, wherein the electrical switches are attached to the rigid member and the rigid member is detachably secured to the steering wheel.

7. An alarm according to claim 6, wherein the rigid member is included as part of a cover that is detachably secured to the steering wheel.

8. An alarm for waking a dozing driver, comprising a rigid ring incorporated into a semirigid steering wheel cover adapted to fit over the top side of a vehicle steering wheel about its periphery so that side portions of the cover resiliently press against the steering wheel to maintain the cover on the steering wheel while allowing displacement of the cover with respect to the steering wheel when grasped in normal manner; a plurality of electrical switches arranged about and secured to the rigid ring so that, when the cover is secured to the steering wheel, a displacement of the cover and rigid ring with respect to the steering wheel will cause at least one switch of the plurality to change from its normal position; means for biasing said rigid ring and cover, when secured to the steering wheel, into a normal position where all switches of the plurality are in their normal position, but so that the normal grasp of the cover and steering wheel displaces the cover and ring from its normal position; alarm means electrically connected to said plurality of switches so that an alarm is given if all switches of the plurality are in their normal position; and means to supply power to the switches and the alarm means.

9. An alarm according to claim 8, wherein the means to supply power to the switches and the alarm means is a battery and wherein the battery and alarm means are attached to the steering wheel cover.

* * * * *